United States Patent [19]

Suzuki et al.

[11] 4,054,749

[45] Oct. 18, 1977

[54] METHOD FOR VERIFYING IDENTITY OR DIFFERENCE BY VOICE

[75] Inventors: Matsumi Suzuki; Saburo Kitamoto, both of Ebina, Japan

[73] Assignee: Fuji Xerox Co., Ltd., Tokyo, Japan

[21] Appl. No.: 745,755

[22] Filed: Nov. 29, 1976

[30] Foreign Application Priority Data

Dec. 2, 1975 Japan .................. 50-144378

[51] Int. Cl.² ........................................ G10L 1/04
[52] U.S. Cl. .................................... 179/1 SB
[58] Field of Search ............. 179/1 SA, 1 SB, 1 SD, 179/1 SC

[56] References Cited

U.S. PATENT DOCUMENTS

| 3,852,535 | 12/1974 | Zurcher ................ | 179/1 SD |
| 3,896,266 | 7/1975 | Waterbury .............. | 179/1 SB |

*Primary Examiner*—Kathleen H. Claffy
*Assistant Examiner*—E. S. Kemeny
*Attorney, Agent, or Firm*—Sughrue, Rothwell, Mion, Zinn and Macpeak

[57] ABSTRACT

In a voice verification system, voice parameters which are highly characteristic of particular voices but have only a limited effectiveness life time (such as pitch) are used. The lifetime or similar time indication is recorded along with the original record of the characteristic parameter. At the time of verification, if the lifetime has been exceeded no verification is made. On the other hand if the lifetime of the recorded characteristic parameter has not been exceeded a verification is made. If the verification is positive the newly obtained characteristic parameter is substituted for the originally recorded parameter and the lifetime begins anew.

5 Claims, 2 Drawing Figures

METHOD FOR VERIFYING IDENTITY OR DIFFERENCE BY VOICE

BACKGROUND OF THE INVENTION

This invention relates to a system or method of verifying the identity of a person by characteristics of his voice.

In identifying a person by the characteristics of his voice, it is a common practice to have a speaker, whose identity is to be verified, utter specific words or clauses and to extract therefrom a characteristic parameter by a certain specified technique and to check said parameter against a prerecorded standard pattern of voice to make a judgement as to whether the voice characteristic is prerecorded based on the magnitude of difference between the two. Generally speaking, a person's voice sometimes changes. This is particularly so when a fairly long time lapses, and a considerable difference is seen between the same person's voice uttered at two different times. Consequently, conventional devices sometimes fail to identify the correct person or incorrectly identify the wrong person.

As a result, it has been devised to extract from the various parameters existing in a person's voice, those having the least possibility of changing with lapse of time and to regard them as the characteristic parameters. While such vocal chord characteristics as information and such sound source as pitch have been considered as appropriate characteristic parameters for voice identification, the latter has hardly been used in practice because it changes drastically with time. Therefore, in most cases only the vocal chord chracteristics, which are liable to change very little, are used. However, it has been discovered that the ability to differentiate or identify voices is greatly improved when sound wave characteristics are used for a short period after recording a standard pattern.

SUMMARY OF THE INVENTION

It is therefore an object of the present invention to extract vocal chord characteristics and/or sound wave characteristics of a person's voice and to fix the period of effectiveness of such characteristics at the time of recording same as the standard or reference pattern, and to prohibit the use for reference purposes of the recorded standard pattern after the lapse of the said effective period. However, when the recorded characteristic pattern is used for identification purposes and the identification is successfully made, the characteristic pattern extracted from the voice of the speaker at the time of verification is substituted for the previously recorded standard pattern so the most recent characteristic parameters available can be always stored.

DETAILED DESCRIPTION OF THE PREFERRED EMBODIMENT

Figure 1:
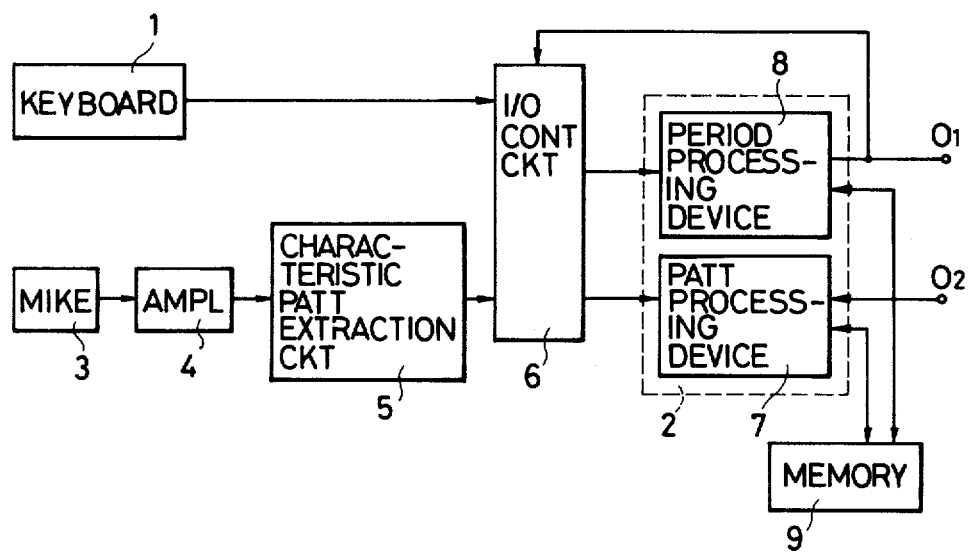
FIG. 1 is a block diagram showing an embodiment of the present invention.

When the system of FIG. 1 is operated to record or register a voice, a code number, which corresponds in effect to an address in memory for a particular person, is fed as an input into the device through keyboard 1. At the same time a period signal such as the date of recording or the effective period of the parameters is also entered into the system. The said effective period is determined based on the accuracy rate required in identifying or differentiating. The period signal may be produced automatically by using a clock device installed within a processing device 2. Next, the speaker utters specified words through a microphone 3, the output of which is amplified by an amplifier 4 and applied to a characteristic pattern extracting circuit 5. The latter circuit operates to extract the sound source characteristic of the pitch information or the vocal chords characteristic of such information, or both, and to feed electrical signals corresponding thereto to a pattern processing/comparator device 7 via an input and output control circuit 6. The output of pattern processing-/comparator device 7 is fed to a memory device 9 as the voice registration or record file together with the aforementioned address or memory number and period signal. The device 7 is part of the processing device 2.

During a verification operation, a person whose voice is to be checked keys in his own code number by means of keyboard 1. The voice characteristics and period signal recorded at an address in memory 9 defined by said code is read out and entered into the pattern processing/comparator device 7 and the period processing-/comparator device 8, respectively. Next, the date or time of verification is keyed in by keyboard 1 and fed to the period processing/comparator device 8, where it is checked against the period information read from the voice record file. The verification time need not be fed through the keyboard, but can be supplied automatically by the clock device installed inside the processing device 2.

After an output appears at a terminal $O_1$, which means the verifying time is within the effective period of the recorded pattern, the speaker speaks into the microphone 3 the same words used previously for making the record. The voice thus uttered is transmitted, and operated upon in the same manner as that followed at the time of initial recording, to the pattern processing/comparator device 7 within the processing device 2. The voice pattern developed is checked against the prerecorded characteristic pattern to detect the difference between them. If the said difference is below a set threshold value or the specified limit, the speaker is judged to be the same as the one whose characteristic pattern was in the record file. If the difference is above the threshold value, the speaker is judged as a different person and a signal is sent out to the terminal $O_2$ accordingly.

When a positive verification is made, the characteristic pattern used for verification is used as a new standard pattern replacing the old one. Also, the time of verification and the effective period based on it are used as a new period signal replacing the old one, and they are fed into the memory device 9 as a voice record file.

If the time of verification is past the effective period, automatic verification by the system is prohibited. Thus the person must be verified by some other means and after such verification he can record a new standard pattern for subsequent automatic verification.

Figure 2:
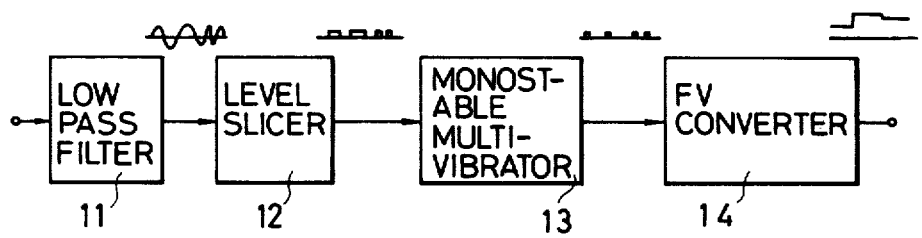
FIG. 2 is a block diagram showing in detail a characteristic pattern extraction system.

FIG. 2 is a block diagram showing an example of the arrangement of a characteristic pattern extraction circuit for obtaining pitch information as the characteristic pattern of voice. After the voice output obtained from the microphone 3 is amplified by the amplifier 4 (FIG. 1), it is applied to a low pass filter 11 which is the input circuit of extractor 5. In one specific example, only low frequency components below 400 Hz pass through filter 11 to a level slicer or amplitude limiter 12. The output of level slicer 12 is a series of constant amplitude pulses of varying duration corresponding to a half period of each input cycle applied to the slicer 12. The latter signals are applied to a monostable-multivibrator 13 which provides a short fixed duration pulse for each pulse input thereto. The timing between output pulses represents pitch information. The latter pulse train is applied to a frequency-to-voltage (FV) converter 14 which operates to provide a voltage level output dependent upon the duration between input pulses. By so doing a voltage wave form or a pitch information characteristic pattern that has direct current level inversely proportionate to the frequency component of voice can be obtained as shown in FIG. 2.

In tests conducted the accuracy rates in differentiation or identification according to the embodiment of the present invention were 100% immediately after the registration of standard voice pattern, 95% after 2 weeks and 75% after 3 months.

As mentioned above, according to the present invention, since the registered standard pattern is renewed within its effective period, any change in the standard pattern due to the lapse of time can be ignored and therefore a high verifying capacity can be maintained for an extended period. Also, according to the present invention, since it can also use for the characteristic parameter the sound source characteristic such as picth information etc, which has an excellent verifying capacity although it changes to a large extent with the lapse of time, the accuracy rate in verification can be improved.

In a verification system for use in identifying a bank depositor seeking to withdraw cash from his deposit account, it is a more serious error to positively verify a wrong person than to fail to identify the true depositor. The former mistake must be avoided by all means. As the present invention can maintain a very high rate of verification efficiency for an extended period of time, it is particularly effective for use in an automatic cash withdrawal machine.

What is claimed is:

1. A method of verifying the identity or non-identity of a voice by comparing electrical signals representing characteristic parameters of the voice to be identified with electrical signals obtained from a record file containing prerecorded characteristic parameters of a voice, the improvement comprising, storing in said record file along with the said characteristic parameters a time characteristic indicative of a duration beyond which said recorded characteristic parameters are not acceptable for verification, extracting said characteristic parameters from a voice to be verified in the form of electrical signals, blocking further verification if the time of verification is after said duration indicated by said recorded time characteristic, and comparing the electrical signals representing said extracted and recorded characteristic parameters and delivering a verification indication only if the time of verification is within the duration indicated by the time characteristic recorded along with said recorded characteristic parameters.

2. The verification method of claim 1 further comprising the steps of replacing in said record file the recorded characteristic parameters with said extracted characteristic parameters and the recorded time characteristic with a new time characteristic dependent upon the time of verification, whenever said verification operation results in a positive identification of a voice.

3. The verification method of claim 2 wherein said characteristic parameters includes at least pitch information of the sound of a voice.

4. The verification method of claim 2 wherein said time characteristic is a date signal representing the time the characteristic parameters are obtained.

5. The verification method of claim 2 wherein said time characteristic is a date signal representing a predetermined time after the time said characteristic parameters are obtained.

* * * * *